US009189277B2

(12) United States Patent
Lee et al.

(10) Patent No.: US 9,189,277 B2
(45) Date of Patent: Nov. 17, 2015

(54) METHOD AND SYSTEM FOR DYNAMICALLY PARALLELIZING APPLICATION PROGRAM

(71) Applicants: SAMSUNG ELECTRONICS CO., LTD., Suwon-si, Gyeonggi-do (KR); UNIVERSITY OF SOUTHERN CALIFORNIA, Los Angeles, CA (US)

(72) Inventors: Seung Won Lee, Hwaseong-si (KR); Shi Hwa Lee, Seoul (KR); Dong-In Kang, Annandale, VA (US); Mikyung Kang, Jeju Special Self-Governing Province (KR)

(73) Assignees: SAMSUNG ELECTRONICS CO., LTD., Suwon-Si (KR); UNIVERSITY OF SOUTHERN CALIFORNIA, Los Angeles, CA (US)

( * ) Notice: Subject to any disclaimer, the term of this patent is extended or adjusted under 35 U.S.C. 154(b) by 126 days.

(21) Appl. No.: 13/947,629

(22) Filed: Jul. 22, 2013

(65) Prior Publication Data

US 2013/0312003 A1 Nov. 21, 2013

Related U.S. Application Data

(63) Continuation of application No. 12/662,657, filed on Apr. 27, 2010, now Pat. No. 8,650,384.

(30) Foreign Application Priority Data

Apr. 29, 2009 (KR) .................. 10-2009-0037726

(51) Int. Cl.
*G06F 9/30* (2006.01)
*G06F 9/50* (2006.01)

(52) U.S. Cl.
CPC .............. *G06F 9/50* (2013.01); *G06F 9/5038* (2013.01); *G06F 9/5066* (2013.01); *G06F 2209/5017* (2013.01)

(58) Field of Classification Search
None
See application file for complete search history.

(56) References Cited

U.S. PATENT DOCUMENTS

| 5,032,986 A | 7/1991 | Pathak et al. |
| 5,893,159 A | 4/1999 | Schneider |
| 6,076,157 A | 6/2000 | Borkenhagen et al. |

(Continued)

FOREIGN PATENT DOCUMENTS

| KR | 10-2007-0059837 | 6/2007 |
| WO | 2007/128168 A1 | 11/2007 |

OTHER PUBLICATIONS

Berna L. Massingill et al., "Patterns for Parallel Application Programs", PLoP, 1999 Conference, pp. 1-29.

(Continued)

*Primary Examiner* — Alan S Miller
(74) *Attorney, Agent, or Firm* — Staas & Halsey LLP

(57) ABSTRACT

Provided is a method and system for dynamically parallelizing an application program. Specifically, provided is a method and system having multi-core control that may verify a number of available threads according to an application program and dynamically parallelize data based on the verified number of available threads. The method and system for dynamically parallelizing the application program may divide a data block to be processed according to the application program based on a relevant data characteristic and dynamically map the threads to division blocks, and thereby enhance a system performance.

17 Claims, 6 Drawing Sheets

(56) References Cited

U.S. PATENT DOCUMENTS

| | | |
|---|---|---|
| 6,334,177 B1 | 12/2001 | Baumgartner et al. |
| 6,567,389 B1 | 5/2003 | Honkasalo et al. |
| 6,886,024 B1 | 4/2005 | Fujita et al. |
| 6,988,186 B2 | 1/2006 | Eickemeyer et al. |
| 7,010,787 B2 | 3/2006 | Sakai |
| 7,036,124 B1 | 4/2006 | Patterson |
| 7,051,329 B1* | 5/2006 | Boggs ............... G06F 9/30123 712/E9.027 |
| 7,082,601 B2 | 7/2006 | Ohsawa et al. |
| 7,184,612 B2 | 2/2007 | Naftali et al. |
| 7,185,185 B2 | 2/2007 | Joy et al. |
| 7,257,633 B2 | 8/2007 | Maspurta et al. |
| 7,343,595 B2 | 3/2008 | Iley et al. |
| 7,363,472 B2 | 4/2008 | Stuttard et al. |
| 7,398,521 B2 | 7/2008 | Hoflehner et al. |
| 7,447,873 B1 | 11/2008 | Nordquist |
| 7,526,636 B2 | 4/2009 | Gazsi et al. |
| 7,574,424 B2* | 8/2009 | Chowdhuri ....... G06F 17/30445 1/1 |
| 7,584,342 B1* | 9/2009 | Nordquist ............. G06F 9/3851 712/22 |
| 7,627,864 B2 | 12/2009 | Du et al. |
| 7,634,637 B1* | 12/2009 | Lindholm ............. G06F 9/3851 712/13 |
| 7,657,883 B2 | 2/2010 | Jensen |
| 7,756,919 B1 | 7/2010 | Dean et al. |
| 8,209,701 B1* | 6/2012 | Roytman ............. G06F 9/5027 718/106 |
| 8,223,779 B2 | 7/2012 | Carroll et al. |
| 8,255,889 B2 | 8/2012 | Stefansson et al. |
| 8,266,337 B2 | 9/2012 | Madruga et al. |
| 8,321,849 B2 | 11/2012 | Nickolls et al. |
| 8,336,056 B1* | 12/2012 | Gadir ............................. 718/104 |
| 8,495,636 B2* | 7/2013 | Bell et al. ...................... 718/102 |
| 8,544,006 B2* | 9/2013 | Bell et al. ...................... 718/100 |
| 8,612,929 B2* | 12/2013 | Kalogeropulos ....... G06F 8/458 717/106 |
| 2002/0116600 A1* | 8/2002 | Smith ................... G06F 9/3851 712/218 |
| 2002/0157086 A1 | 10/2002 | Lewis et al. |
| 2002/0194390 A1* | 12/2002 | Elving ..................... G06F 9/52 719/312 |
| 2003/0014471 A1 | 1/2003 | Ohsawa et al. |
| 2003/0014473 A1 | 1/2003 | Ohsawa et al. |
| 2003/0018684 A1 | 1/2003 | Ohsawa et al. |
| 2003/0232616 A1 | 12/2003 | Gidron et al. |
| 2004/0139433 A1* | 7/2004 | Blythe ................... G06F 9/505 718/100 |
| 2005/0038980 A1* | 2/2005 | Rodgers ............. G06F 9/30152 712/220 |
| 2006/0095807 A1* | 5/2006 | Grochowski ........... G06F 1/206 713/324 |
| 2006/0123401 A1 | 6/2006 | O'Brien et al. |
| 2006/0143350 A1 | 6/2006 | Miloushev et al. |
| 2006/0218123 A1 | 9/2006 | Chowdhuri et al. |
| 2007/0033592 A1 | 2/2007 | Roediger et al. |
| 2007/0157212 A1 | 7/2007 | Berg et al. |
| 2008/0022072 A1 | 1/2008 | Jung et al. |
| 2008/0126539 A1* | 5/2008 | Banerjee ............... G06F 9/5027 709/224 |
| 2008/0291496 A1 | 11/2008 | Hara |
| 2009/0070552 A1 | 3/2009 | Kanstein et al. |
| 2009/0083516 A1* | 3/2009 | Saleem ................... G06F 9/505 712/28 |
| 2009/0158012 A1 | 6/2009 | Hansen et al. |
| 2009/0164759 A1* | 6/2009 | Bell et al. ...................... 712/216 |
| 2009/0165006 A1 | 6/2009 | Ceze et al. |
| 2009/0165016 A1* | 6/2009 | Bell, Jr. ................. G06F 9/5066 718/107 |
| 2009/0254907 A1* | 10/2009 | Neary ................... G06F 9/5027 718/102 |
| 2010/0153959 A1* | 6/2010 | Song ....................... G06F 9/485 718/104 |
| 2010/0251066 A1 | 9/2010 | Radke |
| 2010/0281489 A1 | 11/2010 | Lee et al. |
| 2010/0299499 A1* | 11/2010 | Golla ................... G06F 9/3851 712/206 |

OTHER PUBLICATIONS

Haitham Akkary et al., "A dynamic Multithreading Processor", 1998, IEEE, 11 pp.

Christian Terboven et al., "Data and Thread Affinity in OpenMP Programs", MAW'08, May 5, 2008, Ischia, Italy, Copyright 2008 ACM978-1-60558-091-3/08/05, pp. 377-384.

U.S. Appl. No. 12/662,657, filed Apr. 27, 2010, Seung Won Lee, Samsung Electronics Co., Ltd University of Southern California.

Office Action mailed Oct. 12, 2012 in related U.S. Appl. No. 12/662,657.

Notice of Allowance mailed Apr. 24, 2013 in related U.S. Appl. No. 12/662,657.

* cited by examiner

BLOCK ALLOCATION SCHEME

CYCLING SCHEME

METHOD AND SYSTEM FOR DYNAMICALLY PARALLELIZING APPLICATION PROGRAM

CROSS-REFERENCE TO RELATED APPLICATIONS

This application is a Continuation application based on U.S. application Ser. No. 12/662,657 filed Apr. 27, 2010 and hereby claims the benefit of Korean Patent Application No. 10-2009-0037726, filed on Apr. 29, 2009, in the Korean Intellectual Property Office, the disclosure of which is incorporated herein by reference.

BACKGROUND

1. Field

One or more embodiments relate to a method and system for dynamically parallelizing an application program, and more particularly, a method and system having multi-core control that may dynamically divide a data block to be processed according to an application program, and may dynamically allocate threads to division blocks, respectively, and thereby perform a dynamic parallelization.

2. Description of the Related Art

Currently, processors including a plurality of cores to maximize silicon efficiency are popular. Because of an increase in processor density, a parallel scheme of controlling the plurality of cores, that is, multi-core control is proposed.

The parallel scheme is widely used for cluster super computers and general personal computers (PCs), due to a dissemination of a multi-core technology.

A multi-core processor having a few to tens of cores is currently produced. In the near future, a multi-core processor having hundreds or more cores will be produced.

In a parallel system having the above multi-core processor, many application programs may share increased resources. In this case, the resource demand of the application programs needs to be changed depending on an amount of available resources.

However, even when the amount of available resources is changed, a conventional parallel system may not dynamically utilize the available resources.

In a situation where a parallel application program dynamically operates in the parallel system, a number of threads determined when the parallel application program is generated may be used as resources without considering the number of available threads corresponding to the available resources. Accordingly, when more resources are desired to be used in the parallel application program, a source code may need to be changed and re-compiled.

SUMMARY

According to an aspect of one or more embodiments, there may be provided a system for dynamically parallelizing an application program, the system including a multi-core controller to assign a unique operation to each of plural threads that are generated while running the parallel application program, a block generator to generate a data block having the size of a data area to be processed by the parallel application program, using a block function, a monitoring unit to monitor the multi-core controller to determine a number of available threads, and a decision unit to divide the data block using a map function, and to dynamically determine a thread allocation scheme.

The decision unit may determine a division type of the data block and the thread allocation scheme based on a characteristic of data stored in the data block and the determined number of available threads.

The system may further include a scatter unit to generate threads of performing a same operation using a scatter function, and to allocate the threads to division blocks, respectively, according to the determined thread allocation scheme, and a gather unit to combine the threads using a gather function.

The system may further include a view unit to read data from a corresponding division block in response to a request of each of the threads, and to provide the read data to a corresponding thread, or to store a result of the thread in the corresponding division block using a view function.

According to another aspect of one or more embodiments, there may be provided a method for dynamically parallelizing an application program in a system, the method including generating a data block having the size of a data area to be processed by the application program, using a block function, determining a number of available threads, dividing the data block using a map function, and dynamically determining a thread allocation scheme, and generating threads according to the thread allocation scheme to allocate the threads to division blocks, respectively.

The dividing of the data block and the dynamically determining of the thread allocation scheme further may include determining a division type of the data block and the thread allocation scheme based on a characteristic of data stored in the data block and the determined number of available threads.

The generating of the threads may include generating threads of performing a same operation using a scatter function, to allocate the threads to division blocks, respectively, according to the dynamically determined thread allocation scheme, reading data from a corresponding division block in response to a request of each of the threads, to provide the read data to a corresponding thread using a view function, performing a unique operation in each of the threads, storing a result of the thread in a corresponding division block using the view function, and combining the threads using a gather function.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the exemplary embodiments, taken in conjunction with the accompanying drawings of which.

DETAILED DESCRIPTION

Figure 1:
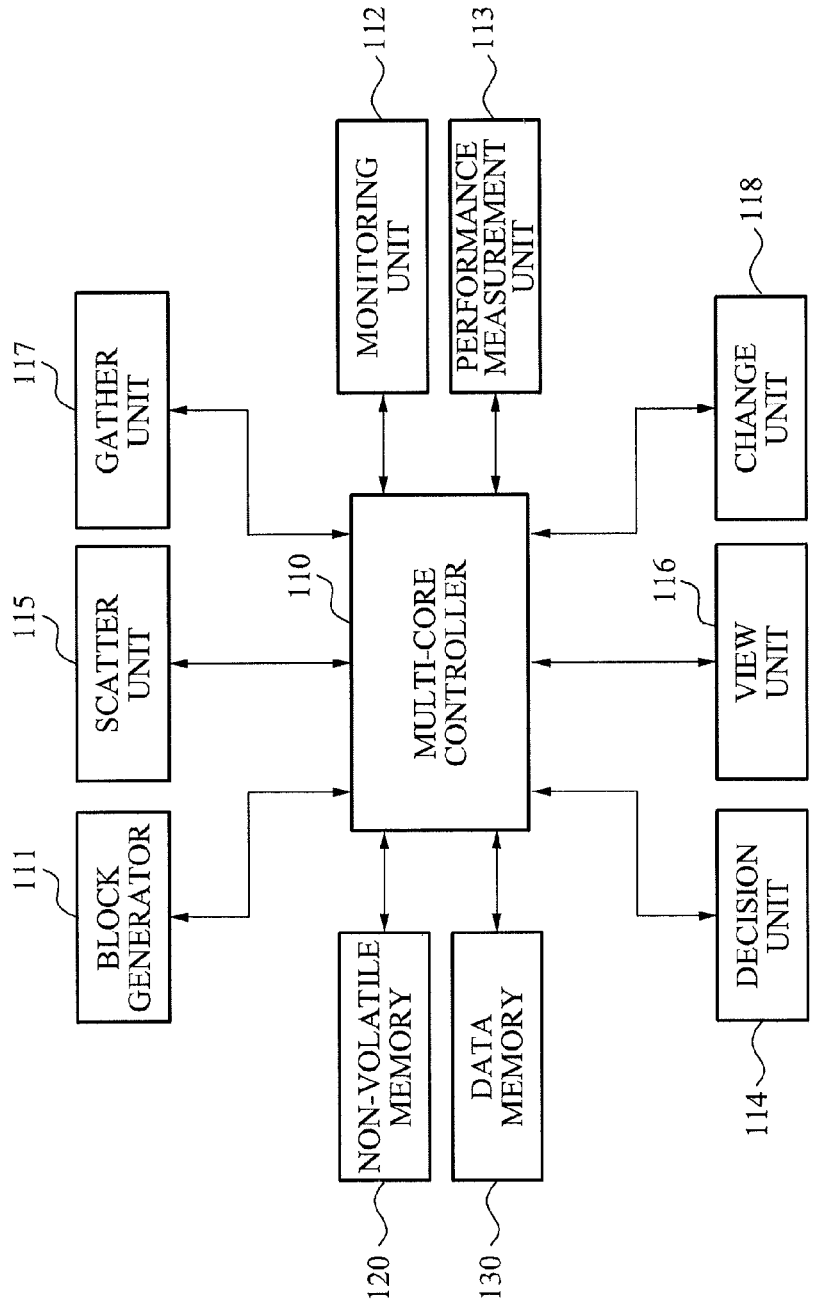
FIG. 1 illustrates a configuration of a system for dynamically parallelizing an application program, according to one or more embodiments.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

According to one or more embodiments, there is provided a system and method having multi-core control that may dynamically divide a data block to be processed according to an application program and dynamically allocate threads to division blocks, respectively, and thereby perform a dynamic parallelization.

FIG. 1 illustrates a configuration of a system for dynamically parallelizing a parallel application program, according to one or more embodiments.

The system may include a multi-core controller 110, a block generator 111, a monitoring unit 112, a performance measurement unit 113, a decision unit 114, a scatter unit 115, a view unit 116, a gather unit 117, a change unit 118, a non-volatile memory 120, and a data memory 130, for example.

The non-volatile memory 120 may store a system parameter and storage data. The non-volatile memory 120 may store an application program, and may store input data to be processed by the application program.

The data memory 130 may temporarily store a data block to be processed by the application program. The data memory 130 may use a Random Access Memory (RAM), for example.

The multi-core controller 110 may have at least two cores, and may function to drive the application program, and to assign a unique function or operation to each of threads generated according to the application program. A number of threads may be generated to be within the number of available cores.

The block generator 111 may verify a data area to be processed by the application program, generate a data block having the size of the data area using a block function, and store the generated data block in the data memory 130.

The monitoring unit 112 may monitor the multi-core controller 110 to verify a number of available threads. The number of available threads indicates a total number of threads that may be simultaneously processed based on a number of available cores that are in an idle state.

The performance measurement unit 113 may measure or predict a performance of the thread allocation system according to the application program.

When a decision request is received according to a progress sequence of the application program, the decision unit 114 may divide the generated data block using a map function, and determine a thread allocation scheme. The data block may be divided according to an input of a programmer, or may be divided based on a characteristic of data stored in the data block.

To consider the number of available threads and the characteristic of data stored in the data block, the decision unit 114 may utilize the thread allocation scheme and a division of the data block having a determined optimum performance based on the measurement or prediction of the thread allocation system according to the parallel application program.

Figure 2A:
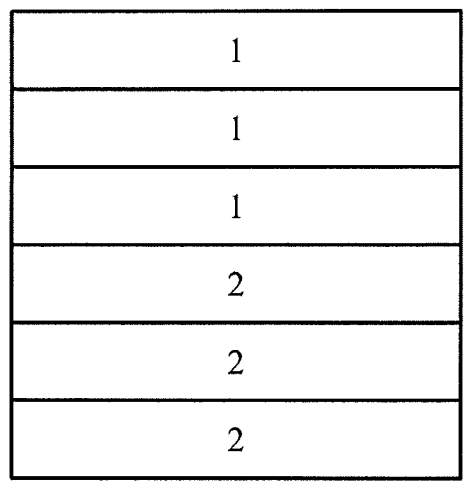
FIGS. 2A and 2B illustrate allocating of threads in a system, according to one or more embodiments.
Figure 2B:
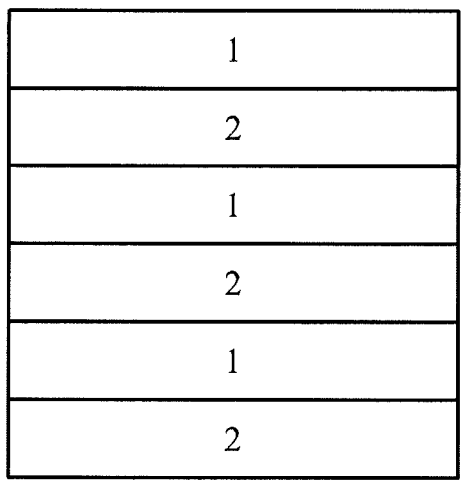

FIGS. 2A and 2B illustrate an allocating of threads in a system, according to one or more embodiments.

FIGS. 2A and 2B show a scheme of allocating two threads {1, 2}. FIG. 2A shows a block allocation scheme, as an available thread allocation scheme. The block allocation scheme may divide a data block into division blocks having approximately equal sizes, and allocate the same thread to adjacent division blocks. The block allocation scheme may be appropriate when data correlation between the adjacent division blocks is relatively high according to an aspect of the relevant data characteristic.

FIG. 2B shows a cycling scheme, as another available thread allocation scheme. The cycling scheme may alternately allocate a thread to division blocks based on a round-robin scheme. The cycling scheme may be appropriate when a data correlation between the adjacent division blocks is relatively low according to an aspect of the relevant data characteristic.

In addition to the aforementioned two schemes, various types of thread allocation schemes may alternatively be applicable.

The decision unit 114 may divide the data block based on the number of available threads and the corresponding data characteristic since the number of available threads and the data characteristic may greatly affect the performance of the application program resulting from the number of divisions and division type. The performance of the application program may vary depending on which thread allocation scheme is used.

When a distribution request is received, according to the progress sequence of the application program, the scatter unit 115 may generate threads for performing the same operation using a scatter function, and may allocate the threads to the division blocks, respectively, according to the determined thread allocation scheme.

The view unit 116 may read data from each of the division blocks allocated with the threads, and provide the data to each of the threads using a view function. The view unit 116 may receive an operation result from each of the threads, and may store the operation result in a division block corresponding to each of the threads using the view function.

Specifically, in response to a request from a thread, the view unit 116 may apply the view function to the thread, and may approach a corresponding data block of the thread to thereby read and write data.

When a combination request is received according to the progress sequence of the parallel application program, the gather unit 117 may combine distributed threads into a single thread using a gather function.

When a request of a programmer, for example, is received, or when a change event according to a change in the number of available threads is detected via the monitoring unit 112, the change unit 118 may increase or decrease the number of threads using a change function. When a change request is received according to the progress sequence of the application program, the change unit 118 may increase or decrease the number of threads using the change function.

The multi-core controller 110 may control the application program and the threads, and may also control the block generator 111, the monitoring unit 112, the performance measurement unit 113, the decision unit 114, the scatter unit 115, the view unit 116, the gather unit 117, and the change unit 118. For example, the multi-core controller 110 may control functions of the block generator 111, the monitoring unit 112, the performance measurement unit 113, the decision unit 114, the scatter unit 115, the view unit 116, the gather unit 117, and the change unit 118. Here, though the above constituent elements are separately shown in the figures, this is done only to separately describe functions of the constituent elements. Accordingly, when an actual product is produced, a portion of or all of the block generator 111, the monitoring unit 112, the performance measurement unit 113, the decision unit 114, the scatter unit 115, the view unit 116, the gather unit 117, and the change unit 118 may be collectively configured to be processed by the multi-core controller 110.

When the system of FIG. 1 is constructed as a library, the library for a dynamic parallelization may include a block function, a map function, a scatter function, a view function, a gather function, and a change function.

Hereinafter, matters dynamically changed by the system when the application program dynamically operates will be described. First, the system may dynamically change the number of threads based on resources available in multi-core control. Second, the system may dynamically change a division type of the data block and a thread allocation scheme based on the number of available threads and characteristics of the relevant data.

The application program dynamically operating in the system may have various types of parallel forms according to various types of combinations among the block function, the map function, the scatter function, the view function, the gather function, and the change function, for example.

FIGS. 3A through 3D illustrate parallelizing of an application program of a system, according to one or more embodiments.

Figure 3A:
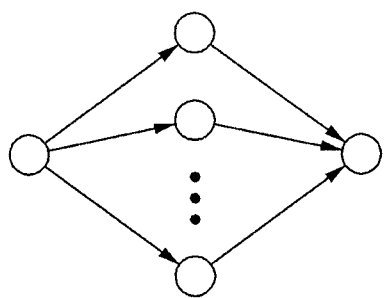
FIGS. 3A through 3D illustrate parallelizing of an application program of a system, according to one or more embodiments.

FIG. 3A illustrates a basic parallel form that is a structure where a thread is distributed into a number of threads corresponding to a number of available threads and the distributed threads are combined into a single thread.

Figure 3B:
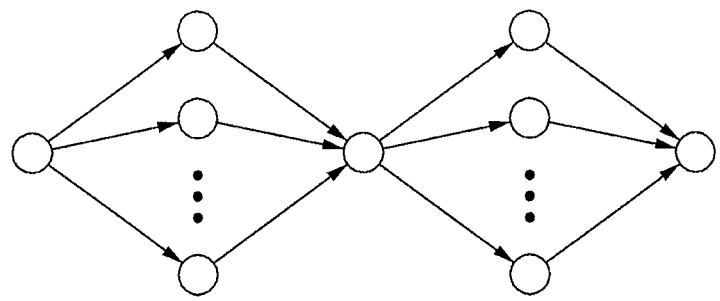

FIG. 3B illustrates a cascade parallel form that is a structure where the basic parallel form of FIG. 3A is sequentially repeated.

Figure 3C:
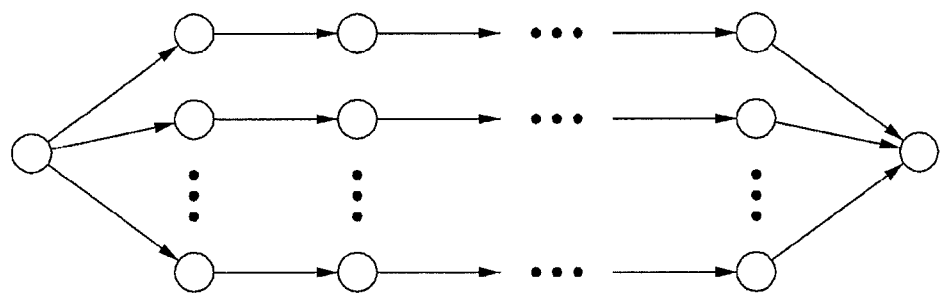

FIG. 3C illustrates a pipeline parallel form that is a structure where a thread is distributed into a number of threads corresponding to the number of available threads and then the same number of threads are maintained to perform a unique operation of each thread, with the threads then being combined into a single thread at a final stage.

Figure 3D:
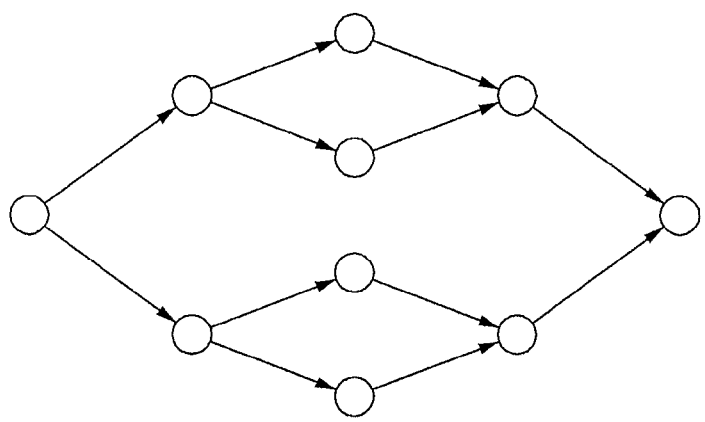

FIG. 3D illustrates a tree parallel form that is a structure where the number of threads gradually increases through a distribution and then the distributed threads are gradually combined back into a single thread.

Although four parallel forms are illustrated, a large number of parallel forms may be applicable according to combinations of the block function, the map function, the scatter function, the view function, the gather function, and the change function, for example.

Hereinafter, as only an example, a method for dynamically parallelizing an application program in a system constructed as above will be described.

Figure 4:
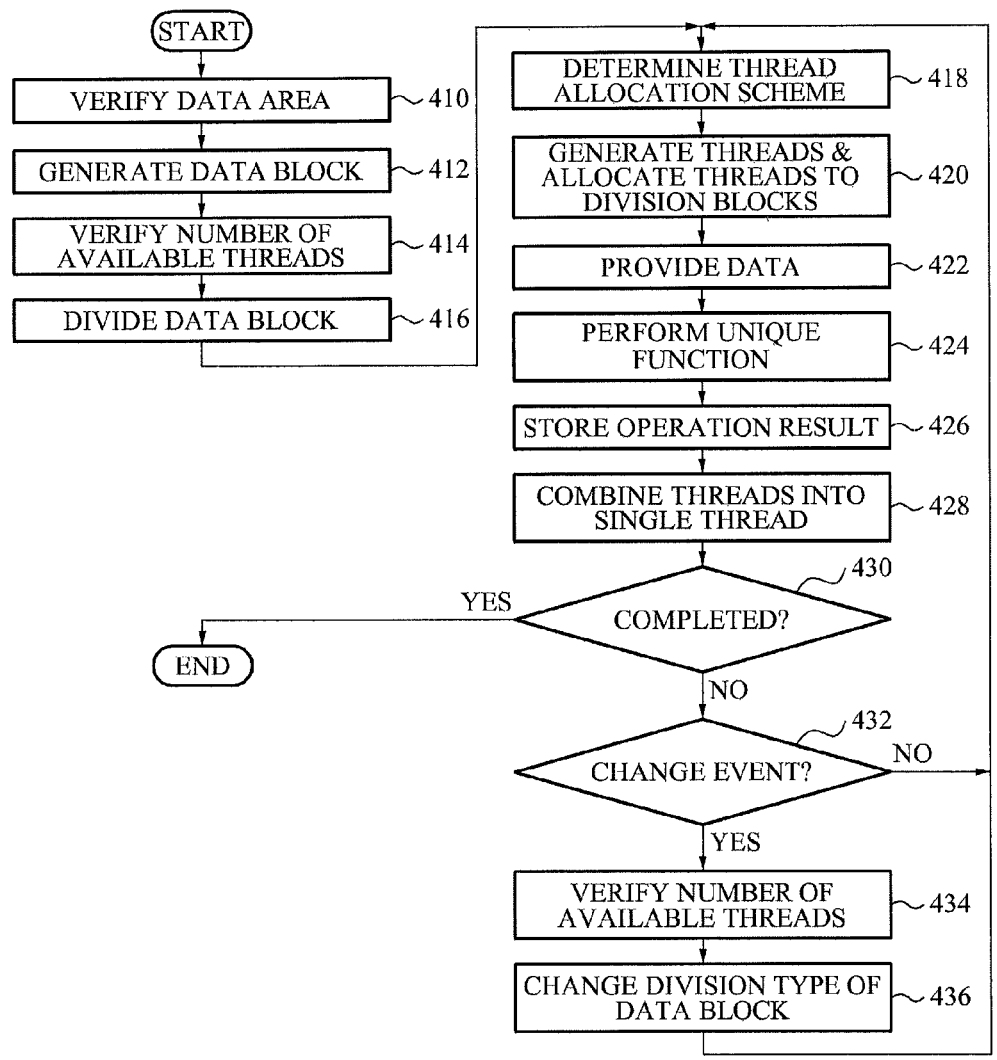
FIG. 4 illustrates a flowchart of a method for dynamically parallelizing an application program in a system, according to one or more embodiments.

FIG. 4 illustrates a flowchart of a method for dynamically parallelizing an application program in a system, according to one or more embodiments.

The application program of FIG. 4 may have a thread structure of a basic parallel form, for example. In operation 410, the application program may verify a data area to process. In operation 412, the application program may generate a data block having a size corresponding to the data area.

In operation 414, the application program may verify a number of available threads. In operation 416, the application program may divide a data block based on the number of available threads and a determined characteristic of the data stored in the data block. In operation 418, the application program may determine a thread allocation scheme based on the number of available threads and the data characteristic.

In operation 420, the application program may generate threads to perform the same operation using a scatter function and allocate the threads to division blocks, respectively, according to the determined thread allocation scheme.

In operation 422, the application program may provide data of a division block corresponding to each of the threads using a view function. In operation 424, the application program may perform a unique operation in each of the threads. In operation 426, the parallel application program may store an operation result of each of the threads in a corresponding division block using the view function.

In operation 428, the application program may combine the distributed threads into a single thread using a gather function.

In operation 430, the application program may verify whether the dynamic parallelization of the application program is completed.

When the dynamic parallelization is completed, a dynamic parallelization algorithm may be terminated. Conversely, when the dynamic parallelization is not completed, the application program may determine whether a change event is detected in operation 432. The change event may occur according to a request of a programmer, for example, a change in the number of available threads, or a progress sequence that is preset when the application program is generated.

When the change event is detected, the application program may verify the number of available threads in operation 434, and change a division type of the data block based on the number of available threads and the characteristic of the data stored in the data block in operation 436. The application program may then return to operation 418.

Conversely, when the change event is not detected, the application program may just return to operation 418.

Figure 5:
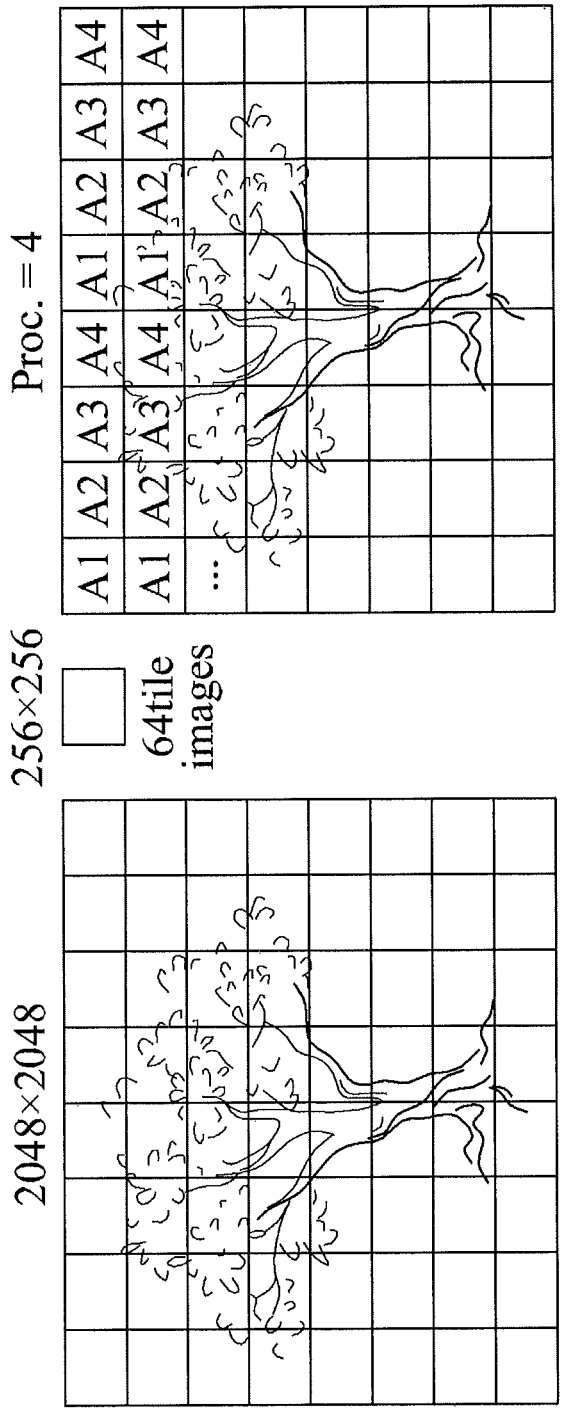
FIG. 5 illustrates an allocating of threads for a J2K codec, according to one or more embodiments.

FIG. 5 illustrates an allocating of threads in a J2K codec, according to one or more embodiments. Referring to FIG. 5, the illustrated left image to be encoded may have a 2048× 2048 pixel size. As illustrated, when the image is divided into 256×256 pixel sizes, the image may include 64 tile images.

Thus, the illustrated left image side of FIG. 5 shows the case where the J2K codec performs encoding without dynamic parallelization, i.e., a single thread may be needed to encode each of the 64 tile images. Accordingly, the total encoding time may be 64 times the amount of time needed to encode a single tile.

The illustrated right image of FIG. 5 shows the case where the J2K codec performs encoding according to a dynamic parallelization. Here, four available threads A1, A2, A3, and A4 may exist. In this case, it is possible to decrease the amount of time by a factor of four, compared to the non-dynamic parallelization encoding, by parallelizing the four threads.

Specifically, as shown in the illustrated right image of FIG. 5, when the threads are paralleled, it is possible to enhance a system performance by maximally using the available threads.

According to one or more embodiments, there is provided a system and method having multi-core control that may dynamically divide a data block to be processed by an application program and dynamically allocate distributed threads to division blocks, respectively, and thereby may perform a dynamic parallelization. Through this, it is possible to verify a number of available threads and to dynamically parallelized data. The system performance may be enhanced by dividing a data block and dynamically allocating the threads using a most efficient scheme based on a characteristic of the data stored in the data block and the number of available threads when dividing a data block and dynamically allocating the threads.

The above-described exemplary embodiments may be implemented by non-transient computer-readable media including computer readable code, such as program instructions, to control at least one processing device, such as a processor or computer. The media may also include, in combination with the example program instructions, data files, data structures, and the like. Examples of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of computer readable code include both machine code, such as produced by a compiler, and files containing higher level code that may be executed by the at least one processing device using an interpreter.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A system for dynamically parallelizing an application program, the system comprising:
a multi-core controller including at least one processing device to assign an operation to each of threads that are generated while running the application program;
a monitoring unit to monitor the multi-core controller to determine the number of available threads during the running of the application program; and
a change unit to change the number of threads based on the determined number of available threads, during the running of the application program,
wherein the change unit selectively increases or decreases the number of threads when a change in the determined number of available threads is detected.

2. The system of claim 1, further comprising:
a block generator to generate the data block having a size corresponding to a data area to be processed by the application program, using a block function.

3. A method for dynamically parallelizing an application program in a system, the method comprising:
assigning, using at least one processing device, a unique operation to each of threads that are generated while running the application program;
determining the number of available threads, during the running of the application program; and
changing the number of threads based on the determined number of available threads, during the running of the application program,
wherein the changing of the number of threads comprises selectively increasing or decreasing the number of threads when a change in the determined number of available threads is detected.

4. The method of claim 3, further comprising:
changing a division type of the data block and the thread allocation scheme using the map function when the change in the determined number of available threads is detected.

5. The method of claim 3, further comprising:
dividing a data block and determining a thread allocation scheme based on the determined number of available threads during the running of the application program; and
generating threads based on the thread allocation scheme and allocating the generated threads to the divided data blocks.

6. The method of claim 5, wherein the dividing of the data block and determining of the thread allocation scheme further comprise:
determining a division form of the data block and the thread allocation scheme based on a characteristic of data stored in the data block and the determined number of available threads.

7. The method of claim 5, wherein the thread allocation scheme corresponds to any one of a block allocation scheme of allocating a same thread to an adjacent division block, and a cycling scheme of alternately allocating a thread according to a round-robin scheme.

8. The method of claim 5, wherein the dividing of the data block and determining of the thread allocation scheme further comprise:
measuring or predicting a performance of the system based on a division type of the data block and the thread allocation scheme; and
determining the thread allocation scheme and the division type of the data block based on the measured or predicted performance.

9. The method of claim 5, further comprising:
generating threads of performing a same operation using a scatter function and allocating the generated threads to division blocks, respectively, according to the determined thread allocation scheme;
reading data from a corresponding division block in response to a request of each of the threads, to provide the read data to a corresponding thread using a view function;
performing an operation in each of the threads;
storing a result of the thread in a corresponding division block using the view function; and
combining the threads using a gather function.

10. The method of claim 3, further comprising:
generating the data block having a size corresponding to a data area to be processed by the application program, using a block function.

11. A system for dynamically parallelizing an application program, the system comprising:
a multi-core controller including at least one processing device to assign an operation to each of threads that are generated while running the application program;
a monitoring unit to monitor the multi-core controller to determine the number of available threads during the running of the application program;
a change unit to change the number of threads based on the determined number of available threads, during the running of the application program; and
a decision unit to divide a data block, and to determine a thread allocation scheme based on the determined number of available threads.

12. The system of claim 11, wherein the decision unit determines a division type of the data block and the thread allocation scheme based on a characteristic of data stored in the data block and the determined number of available threads.

13. The system of claim 11, wherein the thread allocation scheme corresponds to any one of a block allocation scheme of allocating a same thread to an adjacent division block, and a cycling scheme of alternately allocating a thread according to a round-robin scheme.

14. The system of claim 11, further comprising:
a performance measurement unit to measure or predict a performance of the system according to a division type of the data block and the thread allocation scheme,
wherein the decision unit determines the thread allocation scheme and the division type of the data block based on the measurement or prediction of the performance measurement unit.

15. The system of claim 11, further comprising:
a scatter unit to generate threads and to allocate the threads to division blocks, respectively, according to the determined thread allocation scheme; and
a gather unit to combine the threads using a combination function.

16. The system of claim 15, further comprising:
a view unit to read data from a corresponding division block in response to a request of each of the threads, and to provide the read data to a corresponding thread, or to store a result of the thread in the corresponding division block using a view function.

17. The system of claim 11, wherein, when a change in the number of available threads is detected by the monitoring unit, the change unit requests the decision unit to change a division type of the data block and the thread allocation scheme.

* * * * *